Patented Sept. 21, 1926.

1,600,700

UNITED STATES PATENT OFFICE.

OTTO SCHMIDT, THEODOR EICHLER, AND KARL SEYDEL, OF LUDWIGSHAFEN-ON-THE-RHINE, GERMANY, ASSIGNORS TO I. G. FARBENINDUSTRIE AKTIENGESELLSCHAFT, OF FRANKFORT-ON-THE-MAIN, GERMANY, A CORPORATION OF GERMANY.

CELLULOSE-ESTER PLASTIC AND SOLUTION.

No Drawing. Application filed February 26, 1926, Serial No. 90,960, and in Germany December 27, 1922.

We have found that esters formed from paraffine dicarboxylic acids and hydroaromatic alcohols are excellently suitable as plasticizers and solvents for cellulose esters and therefore are valuable substitutes for camphor especially as they have high boiling points and consequently volatilize only with difficulty from the compositions. Most such compounds are solid bodies at ordinary temperature and all of them are very stable. Under the term "paraffine dicarboxylic acids" we mean dicarboxylic acids derived from saturated aliphatic hydrocarbons, with the exception of adipic acid, including oxalic acid and those derived from hydrocarbons of the cyclo-paraffine series. The new plasticizers produce tough, smooth and soft cellulose ester plastics both with cellulose nitrates and acetates and therefore may be employed in most varied manners in the industries of varnishes, films and celluloid. They may be used either alone or together with other plasticizers or solvents of low or high boiling point.

The following examples will further illustrate how our invention may be carried out in practice, but the invention is not limited to these examples. The parts are by weight.

Example 1.

Di-cyclo-hexyl oxalate prepared in the usual manner from oxalic acid and cyclohexanol has a boiling point of 171 to 172° C. at a pressure of 11 millimetres and a melting point of 47° C. For making films, 5 parts of it are mixed with 10 parts of pyroxyline and from 30 to 40 parts of ethyl alcohol. A clear solution is obtained which after evaporation of the alcohol leaves a clear transparent, smooth and flexible film.

The proportions may be varied within wide limits; instead of ethyl alcohol, other solvents may be used; further, other cellulose esters or oxalates of other hydroaromatic alcohols may be employed.

Example 2.

Di-cyclo-hexyl succinate obtained in the usual manner from succinic acid and cyclohexanol has a boiling point of 212° C. under a pressure of 21 millimetres. This ester is excellently suitable as a softener for cellulose nitrate and is very stable when heated together with such cellulose esters; therefore, it may be used advantageously for making celluloid for example by kneading the ester with a cellulose nitrate at an elevated temperature.

What we claim is:

1. The process of producing cellulose ester compositions characterized by the employment of an ester of a paraffine dicarboxylic acid with a hydroaromatic alcohol.

2. The process of producing cellulose ester compositions characterized by the employment of an ester of a paraffine dicarboxylic acid with a hydroaromatic alcohol, and a further plasticizing agent.

3. The process of producing cellulose nitrate compositions characterized by the employment of an ester of a paraffine dicarboxylic acid with a hydroaromatic alcohol.

4. A composition of matter comprising a cellulose ester and an ester of a paraffine dicarboxylic acid with a hydroaromatic alcohol.

5. A composition of matter comprising a cellulose ester, an ester of a paraffine dicarboxylic acid with a hydroaromatic alcohol, and a further plasticizing agent.

6. A composition of matter comprising a cellulose ester, an ester of a paraffine dicarboxylic acid with a hydroaromatic alcohol, and a solvent for both these compounds.

7. A composition of matter comprising cellulose nitrate and an ester of a paraffine dicarboxylic acid with a hydroaromatic alcohol.

8. A composition of matter comprising cellulose nitrate, an ester of a paraffine dicarboxylic acid with a hydroaromatic alcohol, and a further plasticizing agent.

In testimony whereof we have hereunto set our hands.

OTTO SCHMIDT.
THEODOR EICHLER.
KARL SEYDEL.